U S 0 0 6 9 1 7 9 8 2 B 1

US006917982B1

(12) United States Patent
Dueck et al.

(10) Patent No.: US 6,917,982 B1
(45) Date of Patent: Jul. 12, 2005

(54) METHOD AND SYSTEM FOR CONTROLLING PACKAGE-ORIENTED NETWORK TRAFFIC

(75) Inventors: Gunter Dueck, Heidelberg (DE); Marcus Spies, Heidelberg (DE); Klaus Volk, Hoechst (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/465,481

(22) Filed: Dec. 15, 1999

(30) Foreign Application Priority Data

Dec. 19, 1998 (EP) .............................................. 98124148

(51) Int. Cl.⁷ ............................................... G06F 15/16
(52) U.S. Cl. ...................... 709/235; 709/203; 709/226; 709/233; 370/352; 713/153
(58) Field of Search ......................................... 709/235

(56) References Cited

U.S. PATENT DOCUMENTS 5,442,750 A * 8/1995 Harriman, Jr. et al.
5,495,426 A * 2/1996 Waclawsky et al.
5,590,366 A * 12/1996 Bryant et al.
5,706,436 A * 1/1998 Lewis et al.
6,108,782 A * 8/2000 Fletcher et al.
6,185,601 B1 * 2/2001 Wolff
6,230,206 B1 * 5/2001 Doole et al.

* cited by examiner

Primary Examiner—Hosain Alam
Assistant Examiner—Young Won
(74) Attorney, Agent, or Firm—George E. Grosser

(57) ABSTRACT

A method for optimizing package-oriented network traffic control is proposed which can involve constraints to the optimization model which emerged dynamically during the optimization period. Thus, unpredictable events can be considered amongst foreseeable events during the optimization process. For achieving this the method according to the invention uses graphs which are dynamically generated and eventually be varied during the optimization process for managing the above said complex inter-dependencies.

Figure 1:
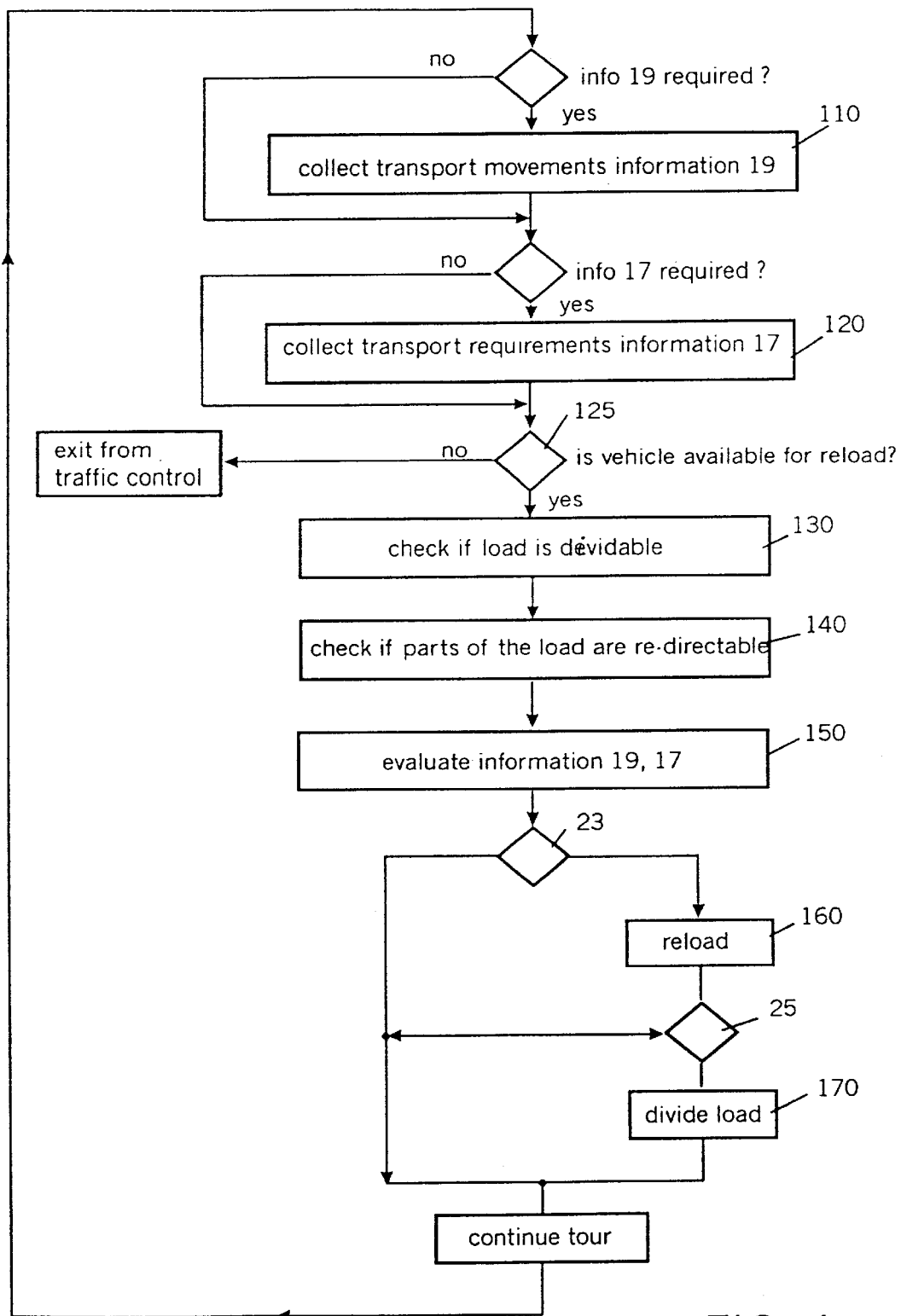

Unexpected changes of the time and loading schedules can be balanced and their negative impact on just in-time delivery of goods can be lowered. Generally, transport costs are reduced and natural resources are saved.

In a preferred embodiment of the inventional method a variable time buffer extension is introduced which is used to extend the availability of the transport vehicle's capacity.

7 Claims, 4 Drawing Sheets

METHOD AND SYSTEM FOR CONTROLLING PACKAGE-ORIENTED NETWORK TRAFFIC

1. BACKGROUND OF THE INVENTION

1.1 Field of the Invention

The present invention generally relates to method and system for controlling network traffic and relates particularly to such method and system for optimizing network traffic control in a network in which at least most of the transports are package-oriented.

1.2. Description and Disadvantages of Prior Art

Although the present invention is applicable to a broad variety of transport processes—including computer data communication processes—in which some transport objects, i.e. package-like loads are moved along the network's path ways the invention is disclosed herein by focusing on an embodiment thereof in which goods are transported by lorries managed by a haulage enterprise and being moved during their tours across a geographical region which is structured by a plurality of transport paths between respective nodes which are generally equipped with a depot for temporarily stocking some loads of goods. Thus, a transport system is established comprising some basic system elements, as are principally the nodes for receipt, delivery and reload/load divide activities and the vehicles transporting the goods. In electronic data communication these system elements are buffers located at node servers and processors with corresponding data connections as transport means.

Today's requirements concerning the just-in-time delivery of goods are increasing due to a permanent cost reduction process reducing particularly the cost of stocking goods or any parts being involved in an industrial production process. This tendency is even expected to be enforced as goods can quickly be ordered via an online order, e.g. via Internet, an instrument by which the ordering client generally expects a quick execution of his order.

In order to achieve said increasing requirements and demands the provider of such delivery services, speditions, etc., employ staff who's job is to generate schedules comprising time planning and loading or reloading planning for the particular orders. Generally they work computer assisted and use electronically stored data concerning order data, transport vehicle data and node depot data.

A further class of such planning tools helps the person disposing said goods to involve particular client orders into the total good shipping concept. In this area of operative disposition the current total situation of the available fleet of transport vehicles which can vary from bicycle to heavy load lorries includes the permanent location monitoring of the vehicles, e.g. via GPS (global positioning system) or via mobile communication. See, for reference, 'Freight Transportation. Special Issue of the Annals of Operations Research', Vol. 16, 1995.

Amongst others, the following parameters are involved therein:

Orders are to be loaded within a load window and have to be delivered within a delivery window. Goods can be transported including intermediate stocking in node depots. By reloading and load division suborders are generated internal to the provider's competence and generally not known to the client. These suborders can also extend only between node depots, so-called inter-depot suborders and include so-called transshipment processes, too, i.e. when a certain load is transported together with others out of economic reasons and is thereby not transported on the direct way to its destination.

Transport vehicles having a given maximum load capacity are available during a given time frame and in a given geographical area.

Depots, normally situated at a node can stock temporarily a given maximum stocking quantity.

A special planning for a particular vehicle and loading schedule referring to passed or future time sections of the planning period.

Loading time windows and delivery time windows and further restrictions special to the particular branch concerned have to be considered, too.

Further restrictions referring to the above said items and parameters are known to a person skilled in the art.

Even when the orders are known at the begin of the total planning period an extensive optimization of a certain number of transports including load division and reloading can not be achieved, as an optimization of such a 'static' freight transportation problem is beyond a human operator's capacity.

If the formulation of the optimization problem is viewed time dependent each reload or load division changes the total system involved in the optimization process. Thus, inter-dependencies between particular vehicle time schedules and other parameters mentioned above may possibly vary globally the network traffic situation if only one condition changes. Thus, only reload—including combining of loads—or load division—which are both basically a good instrument for optimization—can be involved to optimization which are known at the begin of the planning period.

As the daily experience shows that even external variations outside the influence of the dispatcher emerge often unexpectedly as can be e.g. accidents, traffic jams, etc., the optimization problem is very difficult to solve.

1.3. Objects of the Invention

The primary object of the present invention thus consists in providing a method for optimizing package-oriented network traffic control which is able to involve amongst static constraints dynamically emerging constraints, too. Thus, tour and loading/reloading schedules should be automatically generated and updated if they exist already, according to the current overall network traffic situation and freshly incoming orders. It should be noted that 'reloading' is intended to include deposition, delivery, and receipt of transport objects, i.e. material loads or subloads or, alternatively, in computer communication terminology data packets, at any dedicated location in the network.

It is another object of the present invention to provide user interface means for user interaction with a computer program implementing the inventional method.

It is yet another object of the present invention to provide an application of said method to electronic network communication systems.

2. SUMMARY AND ADVANTAGES OF THE INVENTION

These objects of the invention are achieved by the features stated in enclosed independent claims. Further advantageous arrangements and embodiments of the invention are set forth in the respective subclaims.

A method for optimizing package-oriented network traffic control is proposed which can involve constraints to the optimization model which emerge dynamically during the optimization period. Thus, unpredictable events can be considered amongst foreseeable events during a global optimization process. For achieving this the method according to the invention uses graph calculations which are dynamically generated and eventually be varied during the optimization process for managing the above said complex interdependencies.

For material transport objects said calculations are performed in computer systems arranged as a distributed database application in the network. A large geographical region is divided into sections each comprising a plurality of network nodes. The transports and the transport requirements in each of the section are gathered and managed under the rule of a central system database with a respective transport schedule comprising fixed and variable time windows and a preliminary routing node sequence for the transport to follow. Further, there are distributed subsystems provided with remote database systems. On every optimization run performed by the central system a plurality of transport movements are optimized according to the inventional method and have transport schedules to be followed until the next run is completed. The subsystems, however, can additionally gather transport requirements and can involve them into the schedules prescribed by the central system as long as such actions are compliant with said schedules. Any change in schedule is messaged from the issuing remote system to the central system in order to achieve and maintain database integrity and consistence. Insofar, state-of-the-art distributed database technology can be fully applied including radio connections between any transport system element being subjected to the inventional method.

The method of the present invention with the characteristics of claim 1 has the advantage, in relation to the method sketched out in the discussion of prior art technique that the optimization process is improved. Unexpected changes of the time and loading schedules can be balanced and their negative impact on just in-time delivery of goods can be lowered. Generally, transport costs are reduced and natural resources are saved.

In a preferred embodiment of the inventional method as set forth in claim 2 a variable time buffer extension is introduced which is used to extend the availability of the transport vehicle's capacity. Said extension is reset after usage. This is a further means for optimizing the exploitation of transport capacity. Thus, the advantages mentioned above are further enhanced. The optimization can be directed either locally concentrated or extended to the total network system. Further, any business constraints—costs caused by whatever process in the haulage business, staff related constraints, safety of transport processes or others can be integrated into the optimization as some constraints.

In a further modification of the preferred embodiment of the inventional method as set forth in claim 3 the features of the concerned node's local environment is added to the optimization method. This is a further means for optimizing the exploitation of the existing transport capacity. Thus, the advantages mentioned above are further enhanced.

In a further modification of the preferred embodiment of the inventional method as set forth in claim 4 additional temporary nodes are established for exchanging goods between existing nodes. This is a further means for optimizing the exploitation of the existing transport capacity. Thus, the advantages mentioned above are still further enhanced.

3. BRIEF DESCRIPTION OF THE DRAWINGS

Figure 2:
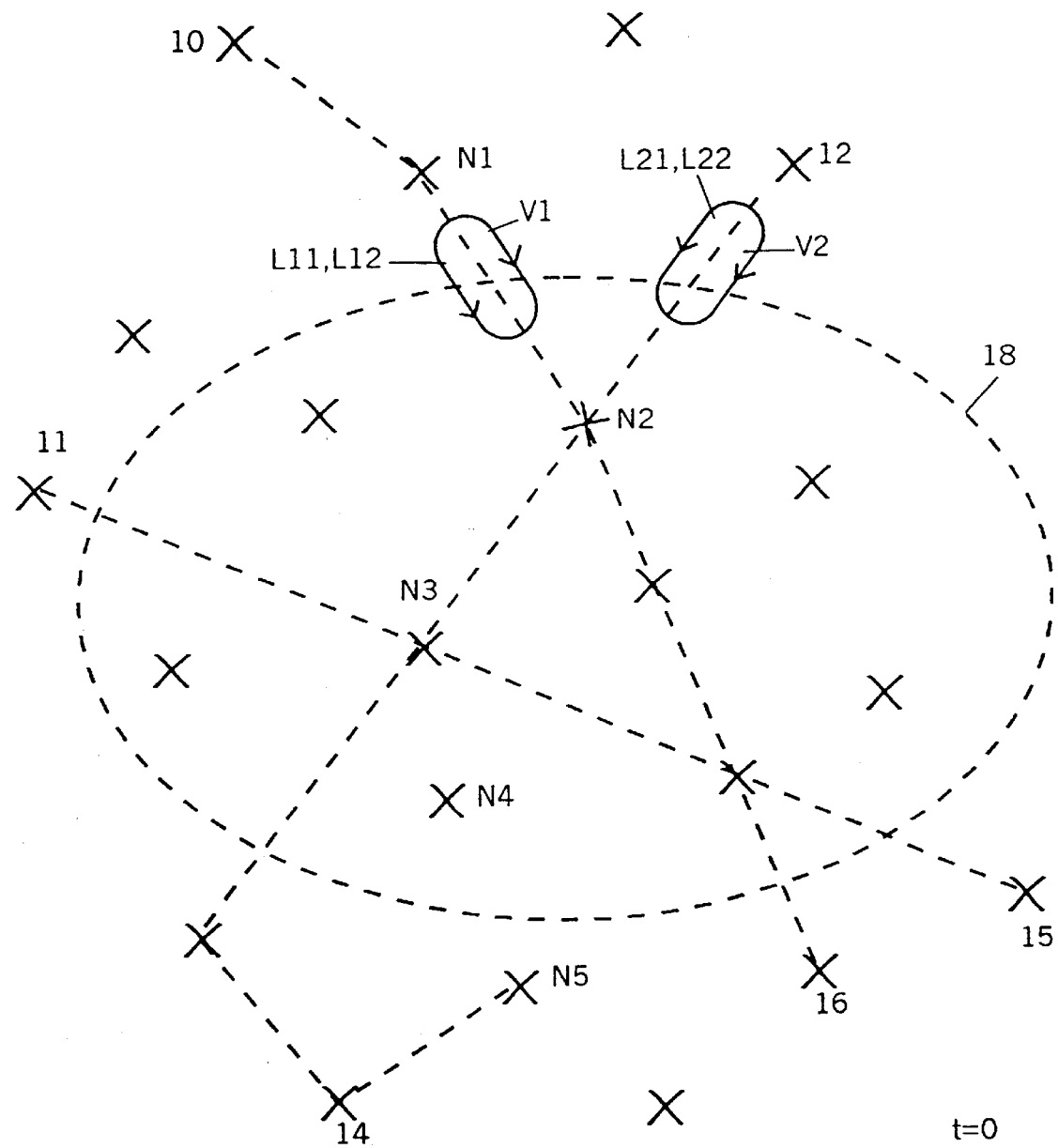
Figure 3:
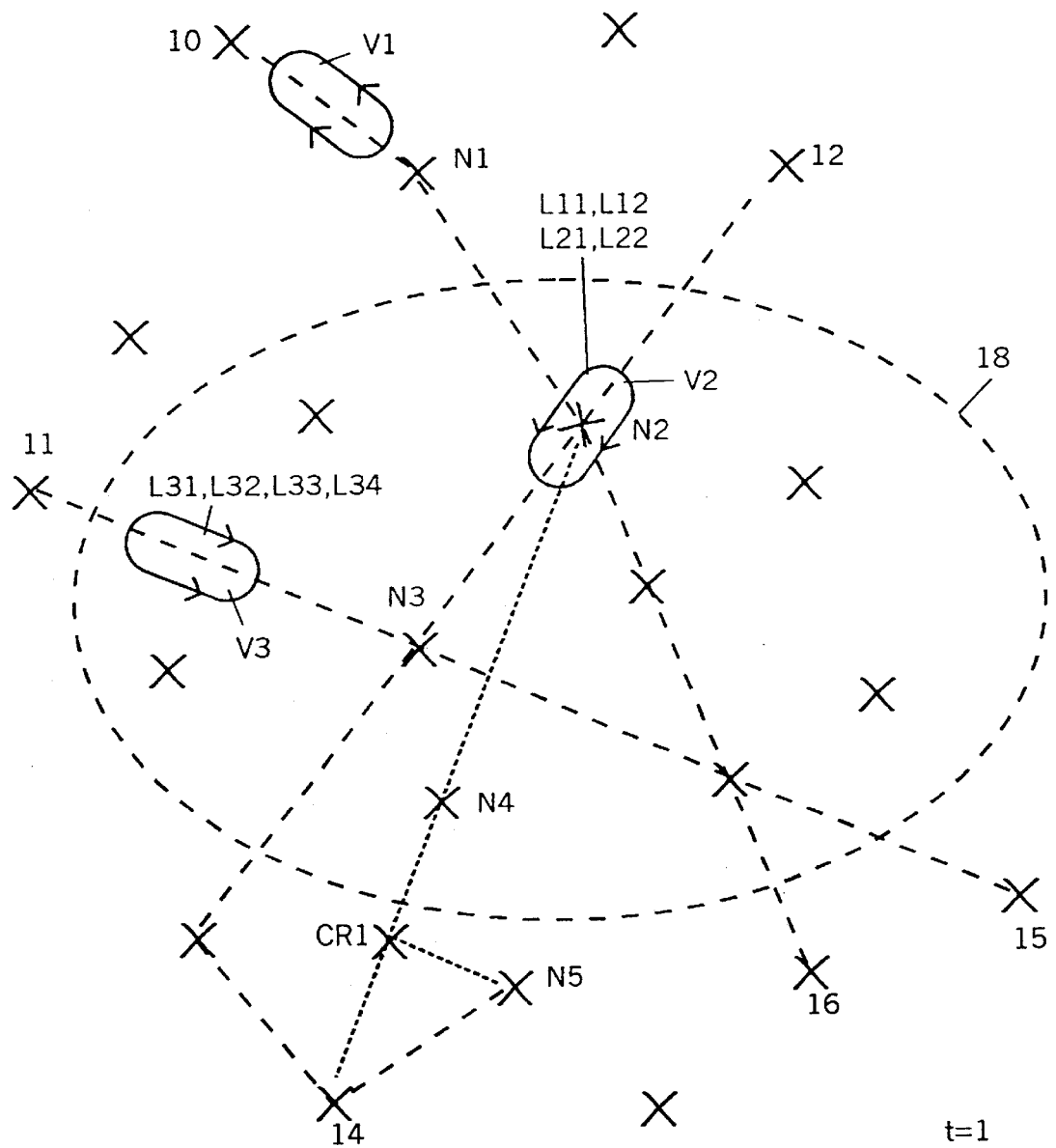
Figure 4:
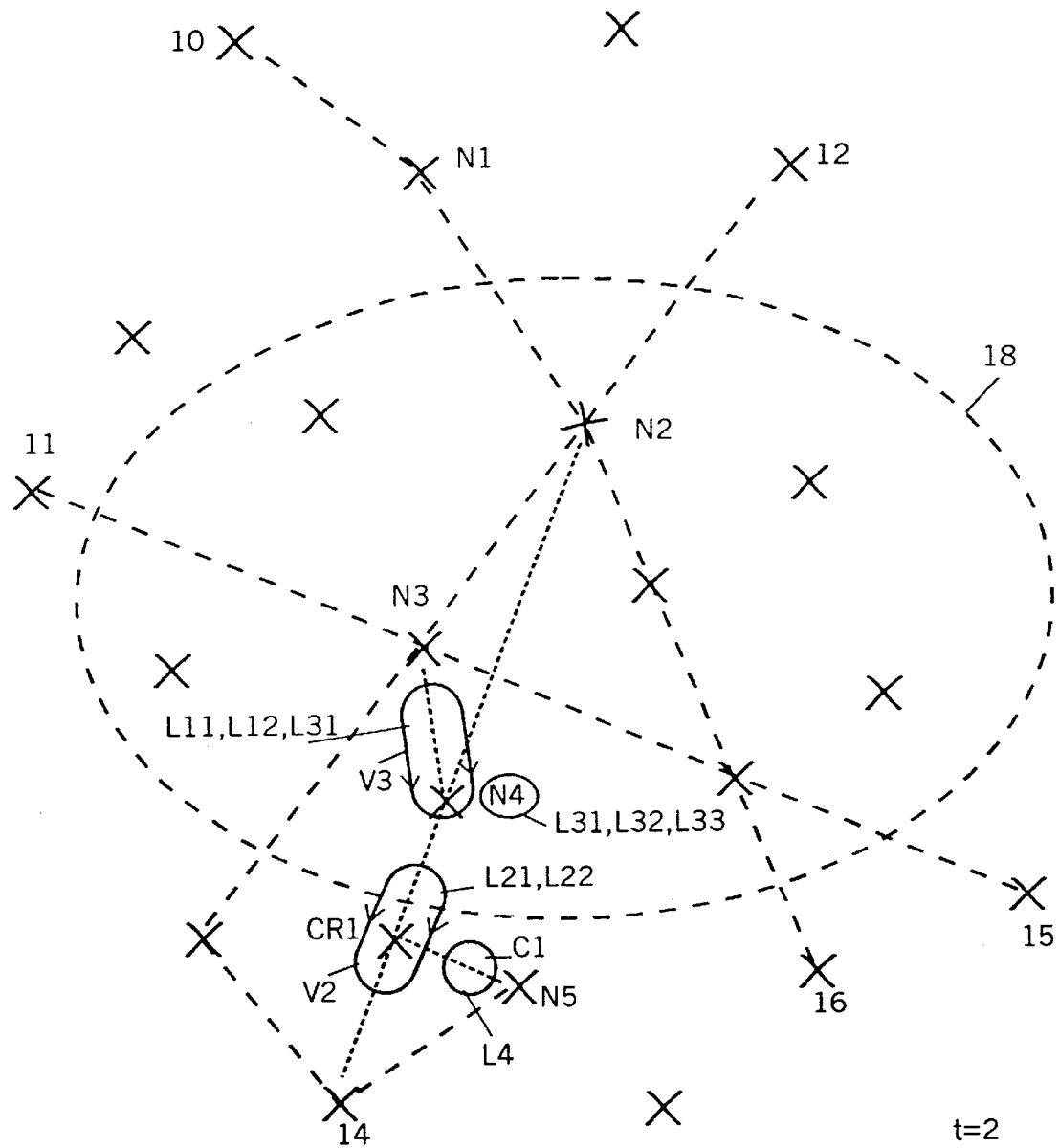

The present invention is illustrated by way of example and is not limited by the shape of the Figures of the accompanying drawings in which:

FIG. 1 is a schematic representation of a block diagram showing the essential steps to be applied for each transport movement in order to achieve the globally optimized network traffic control according to the method of the present invention, FIG. 2 is a schematic sketch of the traffic situation in a network at time t=0, FIG. 3 is a schematic sketch of the traffic situation in a network at time t=1, FIG. 4 is a schematic sketch of the traffic situation in a network at time t=2.

4. DESCRIPTION OF THE PREFERRED EMBODIMENTS

With general reference now to the Figures and special reference now to FIG. 1 the essential steps of a preferred embodiment of the inventional method is described in more detail.

The method according to the present invention controls network traffic in a network. The network topology is not limited any way. As a non-limitative example which is held simple in order to focus on the kernel of the present invention a sample topology is depicted in FIGS. 2 to 4.

The network comprises a plurality of fixed, given transport paths—here just streets—depicted as dotted and broken lines where mentioned in the context of the inventional method, and otherwise not depicted, and nodes, depicted as crosses in the Figures, each provided with a depot having a maximum stock capacity. Further, in each node depot a computer system is present which is able to receive, process and send information relevant to the traffic control process. Said computer systems form a computer network system with respective data links between each other. Between respective nodes delimiting the transport paths, each transport path has a predetermined transport capacity which is realized by respective transport means 8, here, vehicles V1, V2, V3, etc., which represent lorries or just cars.

In the network most of the transports are package-oriented, i.e. the lorry load can be divided and put again together into a varying unspecific number of pieces or so-called subloads without being damaged. The loads are each shipped from a respective originating node 10, 11, 12 to a respective destination node 14, 15, 16 along a preliminary routing node sequence which determine routes being in turn depicted as broken lines.

Assuming now a vehicle fleet comprising three lorries V1, V2, V3 each being loaded at their originating node as follows:

V1 is loaded at originating node 10 with dividable loads L11 and L12 destined for destination node 16.

V2 is loaded at originating node 12 with dividable loads L21 and L22 destined for destination node 14.

V3 is loaded at originating node 11 with dividable loads L31, L32, L33 and L34 destined for destination node 15.

V1, V2 and V3 are assumed to perform 'standard order' transports which can be object to the method according to the present invention in contrast to 'special order' transports, as is explained below in more detail.

In regular time steps information 19 relating to current transport movements anywhere in the local environment of V1 are collected—step 110—because this is required to involve V1 and L11 and L12 into the inventional traffic control process.

This is done by a traffic control system installed at node N2 which is able to exchange data with similar traffic control systems installed in other nodes in the network and with the transport means V1, V2, V3 by mobile communication.

Similarly, information 17 relating to current transport requirements for a predetermined time window in the local environment of V1 are collected—step 120.

In a step 125 it is checked for any vehicle in node N2's environment if a vehicle is available for reloading. As V1's tour is a standard order tour it is flagged as 'available'.

Otherwise V1 would be excluded from the traffic control method.

Further, V1's load is checked if it is able to be divided in at least two subloads L21, L22. As the load is dividable this fact is stored and processed in the traffic control system.

Further, in a step 140 it is checked if at least one of the subloads of said load can principally be redirected on a transport path different to that said load was scheduled before.

Both steps 130 and 140 can be performed in a standardized manner, as both decision are simple yes/no decisions depending of a plurality of conditions which can vary from case to case. This is described down below in more detail.

The size of the above mentioned time window can depend from the current path transport frequency, the node density in V1's local environment, further it can depend from the maximum transport period guaranteed for the transport of L11 and L12.

For certain kinds of transports referenced herein as 'special order' transports no time window is associated for the vehicle as they are not intended to be part of the optimization process due to the transports' safety risks, urgency, etc. In these cases information collection is not 'required' for the vehicle.

The further steps 150 to 170 are illustrated by way of the example given in FIGS. 2 to 4.

V1 starts in node 10, passes node N1 and is destined at t=0 to pass node N2 in 10 minutes. The same time V2 is on it's way from originating node 12 to node N2, V2 having some free transport capacity, however, is expected to reach N2 not earlier than in three hours.

Now the step 150 of evaluating said information 15, 17 gathered before, and described above takes place.

This evaluation which is performed on graph calculation base is described in more detail next below and with reference to a preferred embodiment of the inventional method.

Now an inventional feature i.e. to 'propagate time windows' develops:

According to the invention, V2 will become part of the optimization method although the given calculated time buffer within which loads should arrive at a given node in order to be involved into the optimization is smaller than said three hours in which V2 is expected to arrive in N2.

The computer system in N2 is prioritized as central system with respect to the systems situated at nodes N3, N4. All the systems have a program installed implementing an advantageous embodiment of the inventional method.

Now, according to the invention N2's system extends temporarily the maximum time buffer during which incoming loads are included into the optimization process.

The 'normal', i.e. regular or fixed maximum time buffer is assumed as two hours after V1 reaches N2. Now the program includes a plurality of constraints which are able to influence the current and the future transport situation.

Described in a more general way, the calculation of limits for temporarily tolerated extended maximum time buffers according to the present invention are based on the following principles:

Each transport process takes place within a tolerable order time period. Thus, the buffer interval length must not exceed that period.

The starting time of the buffer interval is the maximum of starting times of all preceding processes plus the respective duration thereof.

The finishing time of the interval is the minimum of all finishing times of all subsequent processes minus the respective duration thereof.

Said tolerable intervals describe time buffers. On each new order insert of a transport process or any involvement of a sub-order transport said time buffers have to be recalculated for the respective process. This influences principally all other time buffers being situated in the directed graph before or after the respective process. This is, however, integrated into the overall optimization by propagating recursively the update of the time buffers back to the source and forward to the drain of the corresponding graph.

As a result of the evaluation step 150 these two hours of normal time buffer are now extended to three and a half hours. Thus, V2's tour is included into the current optimization process relevant for V1 in node N2. In prior art it would probably not be included.

Thus, according to the present invention the system calculates the above mentioned propagation steps and proposes after a decision 23 a reloading—step 160—of subloads L11 and L12 into V2's transport capacity. This takes place after a short intermediate stocking in N2's depot. So, V2 is loaded with L21, L22, L11 and L12, marked by 'flags' in the figure as in the corresponding user interface of the control program in N2.

V1 receives a new destination: It is ordered to return to it's originating node 10 because it is required for performing a new order similar to the last one. V2's transport capacity is used quite effectively, thus some of the intended business goals are achieved, as are for example maximum use of transport capacity, a quick service, etc.

During the reload process—see now FIG. 3 at t=1—V3 comes from another (western) part of the network.

In this network basically the same optimization method could have been applied to any transport processes as is described for part 18 of the network. Furthermore, a large geographic region can be covered with a plurality of parts 18 adjacent to one another similar to cells of cellular mobile communication networks.

V3 which is loaded with L31, L32, L33 and L34 enters the local environment 18 of N2 and thus enters part 18. This is signalized to the N2 station by mobile communication. This event changes the transport strategy for a second time as V3 forms part of the current transport movements and can be object to current transport requirements relating to the current planning period and the local part 18 of the network.

The computer system in N2 having installed a program implementing the inventional method involves V3's transport schedule into the optimization process in order to control the traffic.

As a result thereof compliant with the constraints newly established by the inventional dynamic time windows it is proposed for both V3 and V2 to go to node N4 in order to perform a further reload process in which it is decided in a decision 25 to divide V3's load—see step 170 in FIG. 1. In particular, V3 is ordered to load L11 and L12, and to deposit loads L32, L33 and L34 in node N4's depot. The deposit is necessary otherwise V3's maximum transport capacity would be exceeded—see FIG. 4 at t=2.

Further, V3 is ordered to make a detour passing destination node 16 for delivering L11 and L12 there, and then to destination node 15 in order to deliver L31 there.

V2's route changes, too: instead to go to node N3 the driver is ordered to go to N4 directly, as described above. As N3 is a subsystem it has to respect that decision and the respective database update performed in N2 is replicated in N3 and in N4. Further, V2 is ordered to deposit L11 and L12 there and then to go directly to destination node 14 still loaded with loads L21 and L22.

Thus, for both vehicles a deviation from their preliminary routing node sequence is proposed by the optimizing method.

With reference to FIG. 4 a further optional inventional feature introducing non-permanent transport system elements is packages which can be easily handled.

At t=2 V2 had arrived first at N2 and deposited L11 and L12 as required. Then V2 left the depot. Before reaching the crossing depicted as CR1 it receives a mobile radio call to wait at a gas station immediately behind the crossing CR1 in order to load a further load L4 which is to be delivered by a car C1 coming from N5 which has to perform an order to transport L4 from N5 to destination node 14. Normally, the car transport would have been performed by taking the direct way, but an external event—here a traffic accident—was actually predicted to block the street for the next 5 hours. Thus the car C1 is redirected to make a detour passing the crossing CR1 and stopping at the gas station for reloading L4 to V2.

Thus, the gas station is established in the system as a non-permanent depot as L4 could easily be deposited in the gas station without a rendezvous between V2 and C1 being necessary.

The inventional method described and depicted in a sequence of steps in FIG. 1 is repeated periodically or on a specific demand.

Thus, two basic features of the inventional concept should now be apparent to a person skilled in the art: dynamically divide loads or subloads loads into subloads and dynamically reload some of the subloads into different vehicles as it is required by the optimization method.

Many further parameters can be considered in the evaluation step 150 including pro-active optimization means, i.e. the consideration of current or future network capacity usage of the local environment of a node which is object of a divide or a reload process. As such, probabilities of traffic jams on certain paths at a given time, and even meteorological data can be integrated into optimization. Some further parameters are appended below, others are known to a person skilled in the art and need nod be mentioned explicitly.

There are different types of vehicles having different expectable speed.

Loading and sorting times for goods/loads serve to calculate the earliest possible times for departure. Thus, dispatcher's hard work is facilitated as the order time windows are calculated automatically.

Further, for performing the inventional method there is provided a user interface by which optimization objects like tour segments of vehicles, loading schedules for sub-orders/subloads including the actually used types of vehicles, lorries, cars, used for specific orders, suborders or paths in the network, etc. and including reload processes, can be determined via an user input i.e. done by the dispatcher.

Such user given constraints are permanently associated with the corresponding object and can thus be at least partly excluded from the optimization process. In such a case certain steps are not required to be performed for that order.

Particularly, graphical input and/or output means for supporting user interaction, is provided by a graphical user interface in the node's computer system in which the input/output means have a flag-like attributes collection being directly associated to said optimization objects. The attributes advantageously represent object features being relevant in the network traffic controlling process. The 'flagging' can be realized by any graphical icon possibly including a context-sensitive pop-up window or menu or something similar or equivalent.

In a further embodiment of the current invention the basic concept of the inventional method is applied to the transport of computer communication data objects, i.e. data loads across an computer communication network system. Usually in this field data transport is based on some transport objects, too. Each object which is better mentioned now as a 'data package' or just 'package' has a header having all necessary routing information, a central portion for carrying the essential user data and a trailer commonly having transmission error control information. Loads are different in length basically implied by the length of the user data part. Each package is independently routed through the network. According to the invention it is proposed to apply the basic ideas of dynamically divide and reload goods loads to data packages, too.

A basic inventional feature is that current transport movements information and current transport traffic requirements information is gathered in a node being at least central in a larger region of the overall network.

This is achieved in this case by pre-transmitting for each transport 'order' some essential information to a central node in the network for processing that information applying the inventional method.

Said essential information advantageously contains the amount of data to be transferred, originating and destination node addresses, i.e. locations and some Quality of Service (QoS) information as e.g. the fixed time windows for data pickup and delivery at said respective nodes.

Basically, the step of dividing a data package can be performed by replicating the header information by copying it into the header of a subpackage to be generated. Then the user data part can be divided considering the commonly used bit boundaries, e.g. 8, 16, or 32, 64 bit, etc. As this should only happen after a complete and successful control of the user data in a node the trailing data need not be copied, but respective bit locations must be reserved for error control of the newly generated subpackage, too.

The step of reloading can be performed, too. Here, packages can be combined which have at least a common node on the way to their destination node. As the address keys contain name service information they can be used in order to establish a mapping function which maps each geographical location, determined by an IP address to an embedding larger geographical region. Repeating that process for larger regions embedding the smaller ones it is possible to route a plurality of subpackages as one single data package to one particular node which is common to all subpackages routes.

Being arrived at that node the large package has to be divided again into a plurality of smaller ones depending of the destinations and the current node arrangement. Anyhow, the large package then contains at least one user data partition less than before. As the original subpackage header information is not erased from the data package when it is copied to the large one but, instead is added pragmatically to the user data section the original subpackage header information is still available and can thus be used for a continuation of that process or be used for a single routing as it is done in prior art technique.

In the foregoing specification the invention has been described with reference to a specific exemplary embodiment thereof. It will, however, be evident that various modifications and changes may be made thereto without departing from the broader spirit and scope of the invention as set forth in the appended claims. The specification and drawings are accordingly to be regarded as illustrative rather than in a restrictive sense.

What is claimed is:

1. A method for optimizing network traffic control in a network having a plurality of transport paths between respective nodes, each transport path having a transport capacity realized by respective transport means (V1,V2,V3, C1), in which network at least a portion of transport objects are package-oriented and can be checked for divisability into sub-objects, said transport objects each to be shipped compliant with suitable pickup and delivery time windows from a respective originating node (10,11,12) to a respective destination node (14,15,16) along a routing node sequence, the method comprising the steps of globally collecting (110) current transport movements information (19) from at least a part (18) of the network, and globally collecting (120) for a predetermined planning period current transport requirements information (17) concerning at least said part (18) of the network, checking (125) all transport system elements for availability for reloading, checking (130) for a given transport object if it is able to be divided in at least two sub-objects, checking (140) if at least one of the sub-objects of said load can be redirected on a transport path different to that said object was scheduled before, dynamically establishing non-permanent nodes for reloading and redirecting an object to a different route, the method being characterized by the steps of evaluating (150), at least in part using pro-active organizational means, said information (17,19) gathered before by using graphs comprising possible dynamic time buffers related to transport system elements, said buffers embedding at least temporarily said pickup and delivery time windows in order to achieve globally optimized network traffic, reloading (160) of sub-objects onto either of the plurality of objects according to an optimization decision (23) based on said step of evaluating (150), and/or dividing (170) transport objects into sub-objects according to an optimization decision (25) based on said step of evaluating (150), providing specific for each of a plurality of transport requirements and transport movements a dynamic time window comprising at least two fixed minimum time windows with respective variable time buffers each defining a start time and an end time necessary for adapting the dynamically varying schedules of said transport elements to one another, basing the optimization decision (23,25) on a sequence of steps, dividing at each of the nodes, if possible, the incoming transport object in at least two sub-objects, determining the transport capacity on at least one of the node's outgoing paths within the dynamic time buffer, propagating said total time windows, and moving objects and/or sub-objects within the dynamic time buffer.

2. A program stored on a data carrier usable to install a computer program implementing the method according to claim 1 when read into a computer device.

3. User interface means for user interaction with a computer program implementing the method according to claim 1 for usage with transporting material objects, the interface means comprising means for specifying optimization objects, said optimization objects being at least one of tour segments for vehicles, load and time schedule for orders or suborders including reload processes, type of vehicles used for orders, suborders or paths in the network.

4. The user interface means according to claim 3 comprising graphical input and/or output means for supporting user interaction, the input/output means comprising a flag-like attributes collection being directly associated to said optimization objects and the attributes representing object features being relevant in the network controlling process, a list of proposals coming from a result of said optimization method to be performed only after reconfirmation by the operator.

5. A data storage device having logic instructions stored thereon which implement the user interface means according to either one of claims 3 or 4.

6. Use of the method according to claim 1 for optimizing network traffic with material loads.

7. Use of the method according to claim 1 for optimizing network traffic in a computer communication network.

* * * * *